US005085244A

United States Patent [19]

Funk

[11] Patent Number: 5,085,244

[45] Date of Patent: Feb. 4, 1992

[54] ASSEMBLY FOR CLEANING A DRAIN CONDUIT

[76] Inventor: Douglas H. Funk, 6103 Lakefront Dr., Fort Myers, Fla. 33908

[21] Appl. No.: 669,367

[22] Filed: Mar. 14, 1991

[51] Int. Cl.[5] .......... B08B 3/04; B08B 9/06; F16K 5/06

[52] U.S. Cl. .......... 137/240; 4/255; 4/256; 134/102; 134/169 C; 222/148

[58] Field of Search .......... 4/255, 256; 134/22.12, 134/102, 166 C, 169 C; 137/240, 864, 876, 887; 222/148; 285/156, 370, 397, 915

[56] References Cited

U.S. PATENT DOCUMENTS

| | | | |
|---|---|---|---|
| 376,750 | 1/1888 | Murphy | 285/397 |
| 3,002,871 | 10/1961 | Tramm et al. | 285/397 |
| 3,936,892 | 2/1976 | Miller | 4/255 |
| 3,961,770 | 6/1976 | Wrasman | 251/315 |
| 3,985,150 | 10/1976 | Kindersley | 251/315 |
| 4,070,044 | 1/1978 | Carrow | 285/156 |
| 4,117,694 | 10/1978 | Belmore | 137/340 |
| 4,257,575 | 3/1981 | Runyan | 251/315 |
| 4,697,787 | 10/1987 | Pelleboer | 251/315 |
| 4,760,614 | 8/1988 | Harrison | 4/256 |
| 4,915,133 | 4/1990 | Harrison | 251/315 |

FOREIGN PATENT DOCUMENTS

| | | | |
|---|---|---|---|
| 482593 | 5/1951 | Canada | 4/256 |
| 2212597 | 7/1989 | United Kingdom . | |

*Primary Examiner*—George L. Walton
*Attorney, Agent, or Firm*—William E. Noonan

[57] ABSTRACT

An assembly is disclosed for cleaning a drain conduit. The assembly includes first and second conduit sections that are communicably connected to respective upstream and downstream sections of the drain conduit. A valve, interconnected between the first and second conduit sections, is selectively opened to permit communication between the first and second conduit sections and closed to restrict communication between the first and second conduit sections. A first connector section, communicably attached to and extending transversely from the first conduit section, is selectively engaged by one of a pressure source and a vacuum source to introduce, when the valve is closed, one of a pressure and vacuum, respectively, into first conduit section, whereby the upstream section of the drain conduit is cleaned. A second connector section, communicably attached to and extending transversely from the second conduit section, is selectively engaged by one of a pressure source and a vacuum source to introduce one of a pressure and vacuum, respectively, into the second conduit section whereby the downstream section of the drain conduit is cleaned.

12 Claims, 2 Drawing Sheets

ASSEMBLY FOR CLEANING A DRAIN CONDUIT

FIELD OF THE INVENTION

This invention relates to an assembly for cleaning drain conduits and, in particular, to a permanent in-line assembly that is especially useful for cleaning and maintaining air conditioning and refrigeration condensate lines.

BACKGROUND OF THE INVENTION

Condensate drain lines are widely employed for air conditioning and refrigeration systems. It is not uncommon for these and other types of drain lines to occasionally become partially or completely clogged with debris. Unfortunately, conventional techniques for servicing and unclogging such drain lines have proven to be time consuming and tedious. Typically, such cleaning is performed by introducing, into one end of the line, a pressure that is sufficient to clean out the line and/or remove any blockages therein. Often the service person must gain access to the upper end of the condensate line proximate the air conditioner or refrigeration system so that pressure may be applied at that end. This can be difficult when the unit is located in a small or confined space or is otherwise inconveniently placed, such as in an attic. Moreover, considerable time may be required for servicing, as the upper end of the line must be detached from the air conditioner or refrigeration system and then replaced when the maintenance is completed. Alternatively, the service person may have to cut the line to introduce pressure at an intermediate point. In addition to taking considerable time, this method requires use of a cutting tool and damages the drain pipe, which must then be required or replaced when the servicing is completed.

Because of the time and effort involved in the above techniques for cleaning drain conduits, such service typically tends to be fairly expensive. There is a known device wherein pressure for cleaning or maintaining a conduit is applied through a three-way valve to a section of plumbing located either above or below a separate gate valve in the plumbing. This device is generally intended for use with indoor plumbing fixtures only, and requires the use of a pair of rather intricate and expensive valves. If either of the valves fails, the system is rendered inoperable. Moreover, this known apparatus is intended only for removing blockages from the drains through the application of a positive pressure. The device is not designed for routinely maintaining the pipes to remove debris, which may collect over time to form a blockage.

SUMMARY OF THE INVENTION

It is therefore an object of this invention to provide an assembly that allows drain conduits to be quickly, conveniently and inexpensively maintained, cleaned and unclogged.

It is a further object of this invention to provide an assembly for cleaning drain conduits that is conveniently accessible to service personnel.

It is a further object of this invention to provide an assembly for cleaning drain conduits that is permanently connected in-line with the conduit such that time consuming and expensive cutting and repairing of the conduit are eliminated.

It is a further object of this invention to provide an assembly for cleaning drain conduits that is relatively simple and inexpensive to manufacture and install.

It is a further object of this invention to provide an assembly for cleaning drain conduits that employs an improved, simple valve construction that is less prone to failure and is much less expensive than conventional devices.

It is a further object of this invention to provide an assembly that allows a drain conduit to be routinely maintained by either vacuuming or blowing debris therefrom;

It is a further object of this invention to provide an assembly for cleaning drain conduits that is particularly suited for servicing condensate lines, such as are used in air conditioning and refrigeration systems.

This invention features an assembly for cleaning drain conduits, including first and second conduit sections that are communicably connected to respective upstream and downstream sections of the drain conduit. There are valve means that interconnect the first and second conduit sections. Means are provided for selectively opening the valve means to permit communication between the first and second conduit sections and closing the valve means to restrict communication between the first and second conduit sections. There is a first connector section communicably attached to, and extending transversely from the first conduit section and having engagement means that are selectively engaged by one of a pressure source and vacuum source to introduce, when the valve means are closed, one of a pressure and vacuum, respectively, into the first conduit section. As a result, the upstream section of the drain conduit is cleaned. Further included are a second connector section communicably attached to and extending transversely from the second conduit section and having second engagement means that are selectively engaged by one of a pressure source and a vacuum source to introduce one of a pressure and vacuum, respectively, into the second drain conduit. This permits the downstream section of the drain conduit to be cleaned.

In a preferred embodiment, first conduit section and the first connector section comprise a first unitary T-connector element and the second conduit section and the second unitary connector section comprise a second unitary T-connector element. At least one of the first and second engagement means may include a pressure fitting that is selectively coupled to a source of pressure to introduce such pressure into the respective conduit section when the valve means are closed. At least one of the first and second engagement means may include a mouth portion formed in the connector section. A plug may provisionally cover the mouth portion. Such plug is removable from the mouth portion for engaging a vacuum source with the mouth portion to introduce a vacuum into the respective conduit section. The pressure fitting may be carried by the plug such that pressure may be applied to the respective connector section or, alternatively, the plug may be removed so that a vacuum source may be introduced into the connector section through the mouth portion. The mouth portion may include first thread means and the plug may include complementary second thread means for provisionally engaging the first thread means such that the plug covers the mouth portion.

The valve means may include a ball valve that is rotatable between a first open condition and a second closed condition. The valve means may also include a valve housing in which the ball valve is axially, rotatably mounted. The means for selectively opening and closing may include a handle that is axially secured to the ball valve and rotatably mounted in the valve housing. Such a handle is rotatable between a first position opening the ball valve and a second position closing the ball valve.

DETAILED DESCRIPTION OF PREFERRED EMBODIMENT

Other objects, features and advantages will occur from the following description of a preferred embodiment and the accompanying drawings in which.

Figure 2:
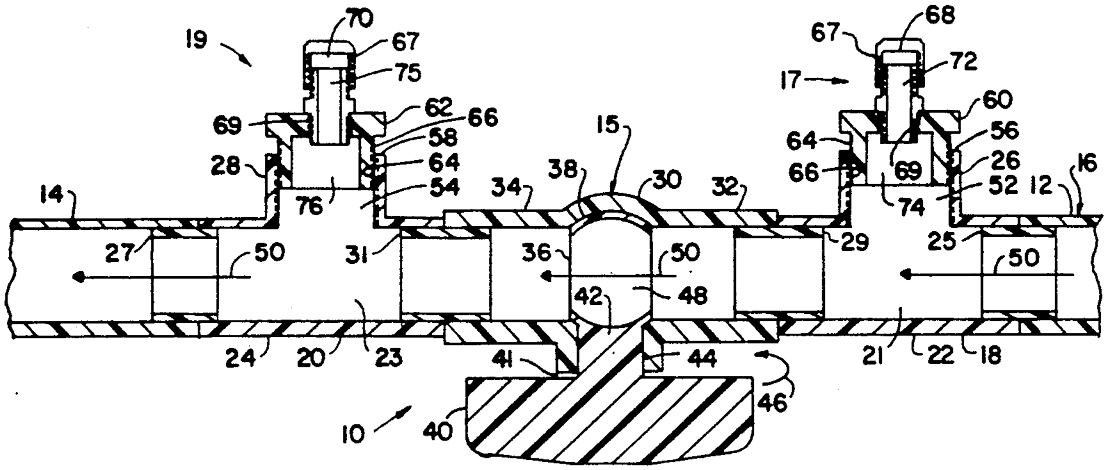
FIG. 2 is an elevational, cross sectional view taken along line 2—2 of FIG. 1, with the ball valve in a open condition.
Figure 3:
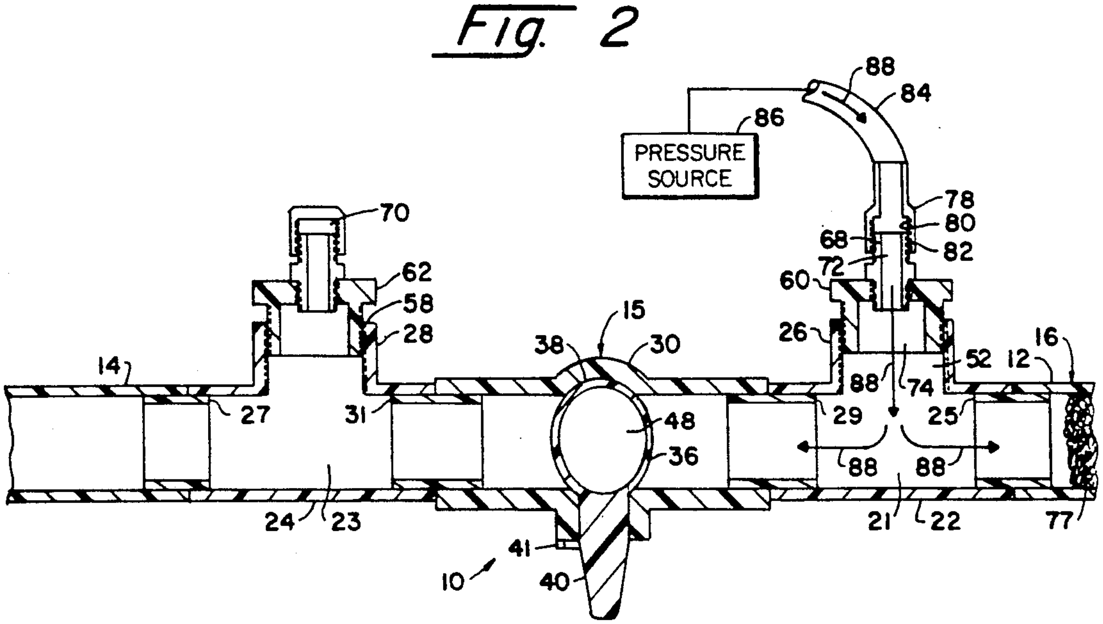
Figure 4:
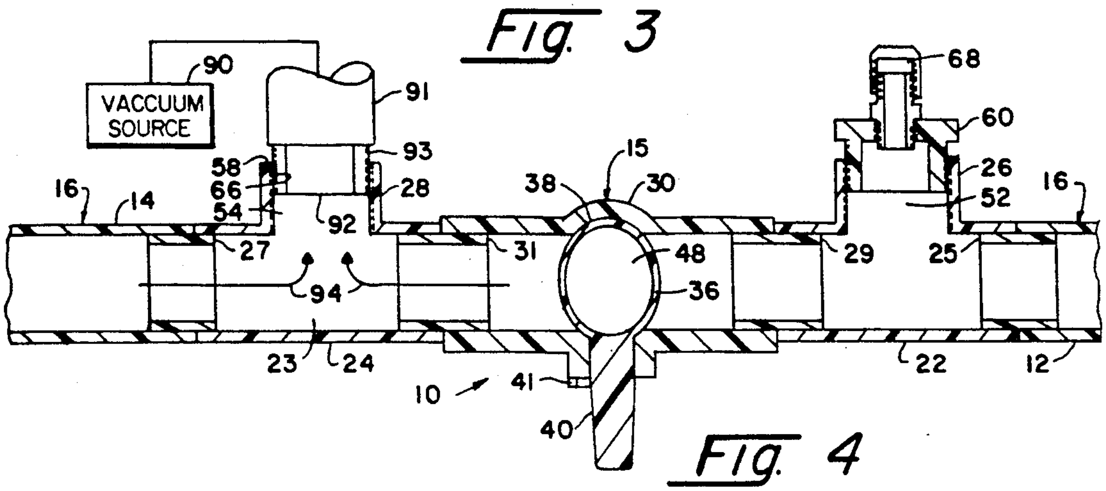

FIG. 3 is a cross sectional, partly schematic view, similar to FIG. 2, of the assembly with the ball valve in a closed condition and a pressure source attached to a selected (upstream) side of the drain line; and FIG. 4 is a cross sectional, partly schematic view, similar to FIGS. 2 and 3, of the assembly with the ball valve closed and a vacuum source connected to a selected (downstream) side of the drain line.

An assembly for cleaning a drain conduit according to this invention may be constructed utilizing a pair of conduit sections that are communicably connected respectively to upstream and downstream sections of the drain conduit. Such conduit sections are preferably defined by a pair of unitary T-type connectors that are composed of PVC pipe or similar material, which is commonly used for condensate lines and other types of drain conduits. A preferred type of pipe is Schedule 40 PVC that is capable of withstanding a pressure of 480 psi. Various other types of PVC pipe may be utilized and alternative plastic or metal materials that generally conform to the materials used in the drain may be employed.

A valve is disposed between the first and second conduit sections for alternately permitting and blocking the flow of fluid between the conduit sections. More particularly, a valve housing, which is constructed of PVC plastic or other material similar to that composing the conduit sections, is communicably connected in a conventional manner with one end of each of the conduit sections. A valve is operably mounted within the valve housing. This valve preferably comprises a ball valve or other relatively simply constructed and operated type of valve. Such a ball valve is much less expensive and less prone to failure and exhibits a construction that is simpler and more dependable than gate valves and other intricate valve mechanisms. An operating handle extends from the valve through the valve housing to the exterior of the assembly. Where a ball valve is used, the handle is simply turned between open and closed positions so that the ball valve rotates to permit passage and block passage, respectively, between the conduit sections. Flow through the valve is blocked so that selected sides of the line may be cleaned, as described below.

Respective connector sections are communicably attached to and extend transversely from the first and second conduit sections. If the conduit sections are formed by T-connectors, the connector sections are formed by respective transverse branches of the T-connectors. Each connector section has a structure that may be engaged, when the valve is closed, by at least one of pressure source or a vacuum source. For example, a pressure source may be attached to the connector section by a ¼" flare fitting, which is widely employed in the air conditioning and refrigeration industries. In alternative embodiments of this invention, various other types of pressure fittings may be utilized. The connector section may also include an opening that is engaged by a hose from a vacuum source so that the respective conduit section and attached section of drain conduit may be vacuumed clean.

In the embodiments described herein, means are provided for attaching both a pressure source and a vacuum source to each of the respective conduit sections. In particular, the distal end of each connector section includes a threaded mouth that selectively receives a threaded plug. A fitting, as previously described, is formed through the plug to the interior of the connector section. This fitting may be engaged by a complementary fitting from a pressure source so that pressure may be introduced when required into the connector section and thereby into the respective conduit section and associated section of the drain conduit. Such pressure is particularly effective for cleaning blockages in either the conduit section or the attached condensate line. Typically, a pressure of up to 50 psig is applied to clear the blockage. However, any pressure within the structural capacity of the pipe may be used.

Alternatively, the plug and attached fitting may be removed so that an opening is provided into the connector section. This opening receives one end of a hose from a vacuum source so that the interior of the line may be conveniently cleaned. By closing the valve conduit, the service person may selectively engage either the upstream or downstream sides of the drain line with a pressure means or vacuum means, as appropriate.

Figure 1:
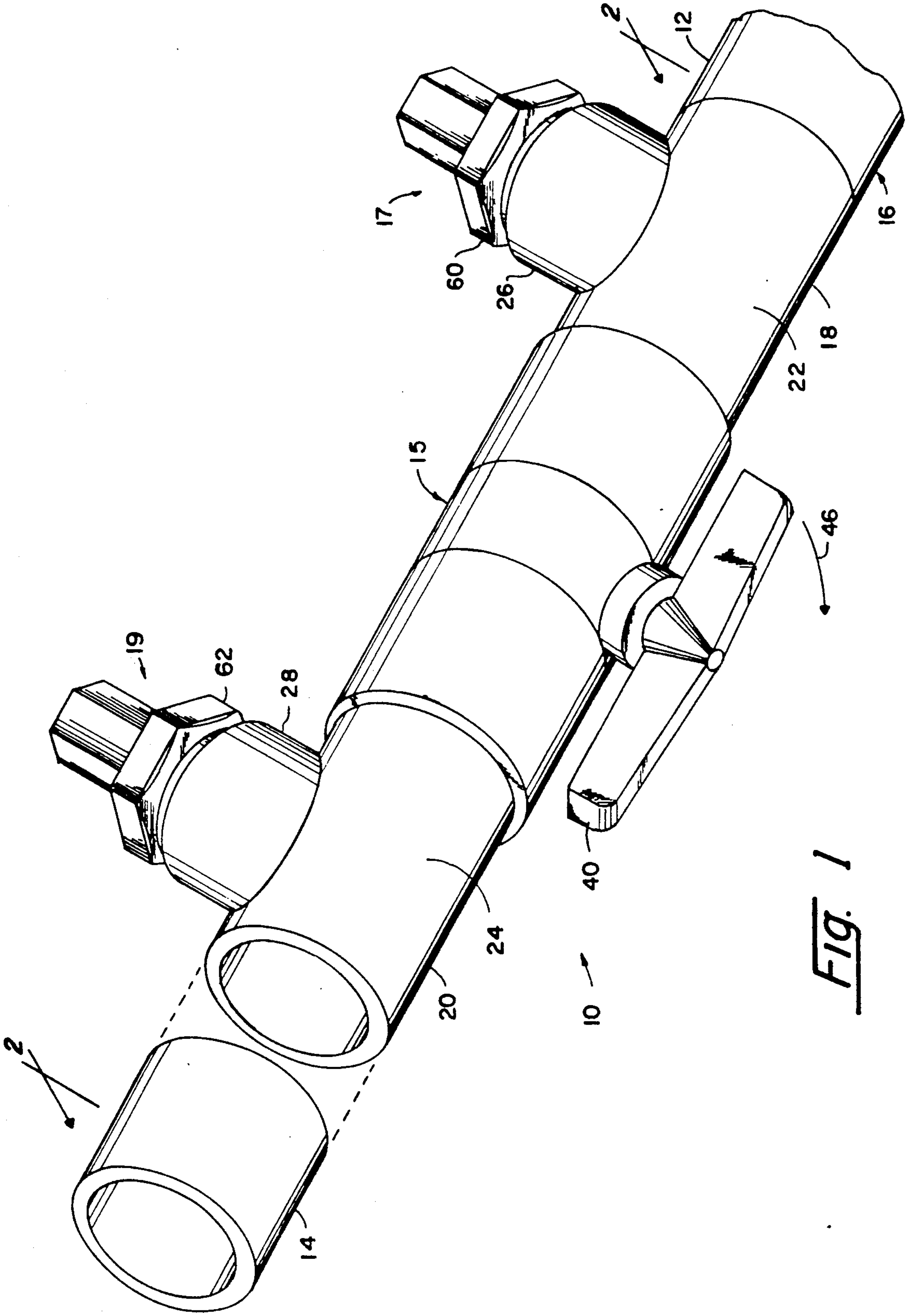
FIG. 1 is a perspective, partly exploded view of an assembly for cleaning a drain conduit, according to this invention, which assembly is interconnected with a condensate drain line to be cleaned or maintained.

There is shown in FIG. 1 an assembly 10 for cleaning upstream and downstream sections 12 and 14 of a condensate drain line 16. Condensate line 16 typically comprises one or more pieces of pipe that are connected in an end to end manner for conducting condensate liquid from an air conditioning or refrigeration system to a remote drain or well, typically located outside. Assembly 10 is interconnected and becomes a permanent part of drain line 16. In particular, the assembly includes a pair of T-connectors 18 and 20 that are communicably attached to upstream and downstream sections 12 and 14, respectively, of drain line 16. T-connector 18 includes a first tubular conduit section 22 that is communicably joined at one end to upstream section 12. T-connector 20 includes a similar tubular conduit section 24 that is communicably attached at one end to downstream section 14. The opposite ends of conduit sections 22 and 24 are joined by a valve mechanism 15. The valve mechanism is operated in the manner described more fully below so that the flow of liquid through assembly 10 is selectively permitted or blocked. T-connectors 18 and 20 further include connector sections 26 and 28 that are integrally attached to and extend transversely from conduit sections 22 and 24, respectively. The connector sections include respective engagement means 17 and 19 that are engaged by a pressure or vacuum source, as described in detail below, to clean the condensate line 16.

As shown in FIG. 2, one end of conduit section 22 is attached to upstream section 12 of line 16 by a sleeve 25 that is snugly received by respective ends of sections 16 and 22. A suitable adhesive is employed to secure the sleeve in place. Conduit section 24 is similarly joined to downstream section 14 by an inner sleeve 27. The valve mechanism 15 includes a valve housing 30 that is constructed of a material similar to that forming the drain line and the conduit sections. Valve housing 30 has opposing branches 32 and 34. Branch 32 is communicably connected to the second end of conduit section 22 by a sleeve 29, and branch 34 is likewise communicably connected to the second end of conduit section 24 by an inner sleeve 31. Again, an adhesive is used between the parts if required. In alternative embodiments, the drain 16, conduit sections 22 and 24 and valve housing 30 may be communicably joined by outer sleeves, flared and/or reduced diameter ends and other means known to those skilled in the refrigeration, air conditioning and plumbing industries.

Valve mechanism 15 includes a ball valve 36 that is operably mounted within a valve seat 38 in housing 30. Ball valve 36 has a central opening 48, shown most clearly in FIGS. 3 and 4. In the open condition, shown in FIG. 2, central opening 48 is axially aligned with the conduit sections 22 and 24 and the upstream and downstream sections 12 and 14 of drain line 16. As a result, condensate is allowed to flow, as indicated by arrows 50, from the upstream section to the downstream section of the drain line. For opening and closing ball valve 36, the valve mechanism also includes an exterior handle 40 that is attached to the ball valve by a rotatable shaft 42. The shaft extends through an opening 44 in valve housing 30. To close valve 36, handle 40 is engaged and turned approximately 90 degrees in the direction of arrows 46, FIGS. 1 and 2. The shape of seat 38 allows the ball valve 36 to rotate within housing 30 from the open condition, shown in FIGS. 1 and 2, and the closed condition shown in FIGS. 3 and 4. Central opening 48 of valve 36 is turned axially perpendicularly to the conduit sections 22 and 24 and flow through the line is blocked. To reopen valve 36, handle 40 is turned approximately 90 degrees in the opposite direction so that the valve mechanism is returned to the position shown in FIGS. 1 and 2. A pair of stops 41, only one of which is shown, are formed in housing 30 to limit movement of handle 40 and prevent the handle from turning past the opened and closed portions.

Connector sections 26 and 28, FIG. 2, are integrally attached to conduit sections 22 and 24, respectively. Connector section 26 comprises a generally tubular segment having an interior channel 52 that communicates with the interior channel 21 of conduit section 22. Likewise, connector section 28 comprises a generally tubular member integrally connected to conduit section 24 and having an interior channel 54 that communicates with the channel 23 of section 24. The distal end of section 26 includes a mouth portion 56 and the distal end of section 28 includes a similar mouth portion 58. These mouth portions are provisionally covered by respective plugs 60 and 62. Each such plug has a threaded portion 64 that engages complementary threads 66 formed about the mouth portion of the respective connector section. Such threads permit the plugs 60 and 62 to be selectively engaged with or removed from connector sections 26 and 28, respectively.

Engagement means 17 and 19 include conventional ¼" flared pressure fittings 68 and 70 that are carried by plugs 60 and 62, respectively. Fitting 68 extends through plug 60 and includes an axial opening 72 that communicates through central opening 74 in plug 60 with channel 52 of connector section 26. Similarly, fitting 70 has an axial opening 75 that communicates through opening 76 in plug 62 with channel 54 of connector 28. The fittings 68 and 70 are secured to the plugs by threads 69, epoxy or alternative attachment means. It is critical, however, that a clear path be provided though the fitting and plug to the interior of the connector section, and, as a result, to the interior conduit section. When the fittings are not in use they may be covered by respective threaded caps 67.

With the ball valve opened, as shown in FIG. 2, condensate is permitted to flow through the line. This is the desired position of the assembly during normal operation of the refrigeration or air conditioning system. If, however, a blockage occurs or if routine maintenance is required, assembly 10 is operated, as shown in FIGS. 3 and 4. In FIG. 3, a blockage 77 is depicted in upstream section 12 of drain line 16. To clean the blockage, valve 36 is closed, as previously described, to block the flow through the line, the cap 67 on fitting 68 is removed and a pressure source 86 is engaged with fitting 68. More particularly, pressure source 86 has an external hose 84 that is communicably attached to fitting 68 by a female fitting 78. The female fitting has internal threads 80 that threadably engage external threads 82 on fitting 68, so that the fittings are coupled. A gas or liquid under pressure from source 86 is transmitted in the direction of arrows 88 through hose 84, openings 72 and 74, and channel 52 into channel 21 of section 22. Because the ball valve 36 is closed, fluid is prevented from passing through valve housing 30. Pressure builds within conduit channel 21 and upstream drain section 12 until this pressure dislodges blockage 77. When this occurs, the drain line is unclogged and, in most cases, normal operation may be resumed. Accordingly, fitting 78 of pressure source 86 is removed from fitting 68; valve 36 is re-opened to the position of FIG. 2 and condensate is again allowed to flow in the direction of arrows 50.

If, alternatively, the blockage occurs in the downstream section 14, the pressure source 86 is attached to fitting 70 associated with connector section 28. The ball valve 36 is again closed and pressure is applied to the downstream section until the clog or blockage is eliminated.

Vacuum source 90 may be used, FIG. 4, for the routine maintenance of conduit line 16. Vacuum source 90 includes a conventional vacuum hose 91 and a nozzle 92 formed at the distal end of hose 91. To clean downstream drain section 14, plug 62, FIGS. 1-3, is detached from mouth portion 58 of connector section 28. The vacuum nozzle 92 is then inserted into the channel 54 of connector section 28. Threads 93 are formed circumferentially about the nozzle 92 so that the hose may be releasably engaged with threads 66 of connector section 28. In alternative embodiments, threads may be omitted from the hose and the nozzle may simply be inserted into the channel 54. In either event, a fairly close tolerance should be provided between the outer circumference of the nozzle and the inner circumference of connector section 28 so that a proper vacuum is maintained.

After nozzle 92 has been inserted into channel 54 and with ball valve 36 in the closed position, the vacuum source 90 is operated so that a vacuum is drawn in the channel 23 of conduit section 24 and, likewise, in the downstream drain section 14. This vacuum causes debris to be drawn in the direction of arrows 94 into the hose. As a result, the debris is collected by the vacuum and eventually discarded.

During the vacuuming operation, valve 36 remains closed. As a result, vacuum source 90 does not draw a vacuum in conduit section 22 or upstream drain section 12. Only conduit section 24 and downstream drain section 14 are cleaned. After this portion of the line is serviced, the vacuum hose 91 is removed from connector section 28 and plug 62 is replaced on the connector section. The service person may then vacuum the first conduit section 22 and the upstream drain section 12 in an analogous manner. To perform this operation, plug 60 is removed from section 26 and nozzle 92 of hose 91 is engaged with channel 52 of connector section 26. Ball valve 36 remains closed and vacuum source 90 is activated so that a vacuum is drawn in channels 52 and 21, and in the upstream drain section 12. In alternative embodiments, the upstream section 12 may be vacuumed prior to the downstream section 14. The vacuum may also be attached to upstream connector section 26 in order to accelerate drainage of an air conditioning evaporator pan. When service is preformed on the evaporator, water and chemicals are typically deposited in the pan, which is drained by the condensate line. To accelerate such drainage, the vacuum unit is attached to the upstream side of the line, as described above, and operated to suck water out of the pan through the line. As a result, servicing of the system is accelerated considerably.

Assembly 10 is permanently installed in a condensate line by removing a section of the drain line between upstream section 12 and downstream section 14. One end of conduit section 22 is then attached to upstream section 12, in the manner described above, and the opposite end of conduit section 24 is similarly attached to downstream section 14. Thereafter, assembly 10 remains permanently connected to condensate line 16 and is utilized when required.

Accordingly, an improved, yet simplified assembly is disclosed for both cleaning blockages and performing routine maintenance. It should be noted that in certain embodiments the pressure source may be used for maintenance and the vacuum source may be employed to clean blockages. The assembly is typically placed at a location that is conveniently accessible to service personnel, preferably as close as possible to the start of the drain.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. An assembly for cleaning a drain conduit comprising:

first and second conduit sections that are communicably connected to respective upstream and downstream sections of said drain conduit;

valve means attachably interconnecting said first and second conduit sections;

means for selectively opening said valve means to permit communication between said first and second conduit sections and closing said valve means to restrict communication between said first and second conduit sections;

a first connector section communicably attached to and extending transversely from said first conduit section and having first engagement means that are selectively engaged by one of a pressure source and a vacuum source to introduce, when said valve means are closed, one of a pressure and vacuum, respectively, into said first conduit section, whereby said upstream section of said drain conduit is cleaned of blockages and debris therein; and a second connector section communicably attached to and extending transversely from said second conduit section and having second distinct and spaced apart engagement means that are selectively engaged by one of a pressure source and a vacuum source to introduce one of a pressure and vacuum, respectively, into said second conduit section, whereby said downstream section of said drain conduit is cleaned of blockages and debris therein.

2. The assembly of claim 1 in which said first conduit section and said first connector section define a first unitary T-connector element and said second conduit section and said second connector section define a second unitary T-connector element.

3. The assembly of claim 1 in which said valve means includes a ball valve that is rotatable between a first open condition and a second closed condition.

4. The assembly of claim 1 in which at least one of said first and second engagement means includes a mouth portion formed in said connector section, said mouth portion being selectively engaged by a vacuum source to introduce a vacuum into said respective conduit section.

5. The assembly of claim 4, further including a plug for provisionally covering said mouth portion and being removable therefrom to engage said vacuum source with said mouth portion.

6. The assembly of claim 5 in which each said engagement means further includes a pressure fitting carried by said plug, said pressure fitting being selectively coupled to a source of pressure when said plug covers said mouth to introduce such pressure into said respective conduit section when said valve means are closed.

7. The assembly of claim 5 in which said mouth portion includes first thread means and said plug includes complementary second thread means for provisionally engaging said first thread means such that said plug covers said mouth portion.

8. The assembly of claim 1 in which said valve means includes a ball valve that is rotatable between a first open condition and a second closed condition.

9. The assembly of claim 8 in which said valve means includes a housing in which said ball valve is axially rotatably mounted.

10. The assembly of claim 9 in which said means for selectively opening and closing includes a handle that is axially secured to said ball valve and rotatably mounted in said valve housing, said handle being rotatable between a first position for opening said ball valve and a second position for closing said ball valve.

11. An assembly for cleaning a drain conduit comprising:

first and second conduit sections that are communicably connected to respective upstream and downstream sections of said drain conduit;

valve means attachably interconnecting said first and second conduit sections;

means for selectively opening said valve means to permit communication between said first and second conduit sections and closing said valve means to restrict communication between said first and second conduit sections;

a first connector section communicably attached to and extending transversely from said first conduit section and having a first engagement means that is engageable by a pressure source to introduce, when said valve means are closed, a pressure into said first conduit section, whereby said upstream section of said drain conduit is cleaned of blockages and debris therein; and a second connector section communicably attached to and extending transversely from said second conduit section and having a second distinct and spaced apart engagement means that is engageable by a pressure source to introduce a pressure into said second conduit section, whereby said downstream section of said drain conduit is cleaned of blockages and debris therein.

12. An assembly for cleaning a drain conduit comprising:

first and second conduit sections that are communicably connected to respective upstream and downstream sections of said drain conduit;

valve means attachably interconnecting said first and second conduit sections;

means for selectively opening said valve means to permit communication between said first and second conduit sections and closing said valve means to restrict communication between said first and second conduit sections;

a first connector section communicably attached to and extending transversely from said first conduit section and having a first engagement means that is engageable by a vacuum source to introduce, when said valve means are closed, a vacuum into said first conduit section, whereby said upstream section of said drain conduit is cleaned of blockages and debris therein; and a second connector section communicably attached to and extending transversely from said second conduit section and having a second distinct and spaced apart engagement means that is engageable by a vacuum source to introduce a vacuum into said second conduit section, whereby said downstream section of said drain conduit is cleaned of blockages and debris therein.

* * * * *